United States Patent
Fernandez-de-Castro

[19]

[11] Patent Number: 6,111,730
[45] Date of Patent: Aug. 29, 2000

[54] DUAL LAYER MAGNETIC EXCHANGE STABILIZATION FOR MR HEADS

[75] Inventor: Juan J. Fernandez-de-Castro, Lakeville, Minn.

[73] Assignee: SeagateTechnology, Inc., Scotts Valley, Calif.

[21] Appl. No.: 08/945,449

[22] PCT Filed: Sep. 2, 1997

[86] PCT No.: PCT/US97/15428

§ 371 Date: Oct. 22, 1997

§ 102(e) Date: Oct. 22, 1997

[87] PCT Pub. No.: WO98/49676

PCT Pub. Date: Nov. 5, 1998

Related U.S. Application Data

[60] Provisional application No. 60/044,340, Apr. 28, 1997.

[51] Int. Cl.[7] .................................................. G11B 5/39
[52] U.S. Cl. ........................................................ 360/327.1
[58] Field of Search ............................. 360/113; 324/252; 338/32 R

[56] References Cited

U.S. PATENT DOCUMENTS

| | | | |
|---|---|---|---|
| 5,434,826 | 7/1995 | Ravipati et al. ........................ | 367/140 |
| 5,491,600 | 2/1996 | Chen et al. ............................. | 360/113 |
| 5,495,378 | 2/1996 | Bonyhard et al. ..................... | 360/113 |
| 5,646,805 | 7/1997 | Shen et al. ............................. | 360/113 |

FOREIGN PATENT DOCUMENTS 8-45035  2/1996  Japan .

*Primary Examiner*—William R. Korzuch
*Attorney, Agent, or Firm*—Westman, Champlin & Kelly, P.A.

[57] ABSTRACT

A magnetoresistive (MR) head (100) for use in a data storage system includes an MR sensor layer (170) and a soft adjacent layer (SAL) (120) disposed along a length of the MR sensor layer and adapted to vertically bias the MR sensor layer. A spacer layer (130) is formed between the MR sensor layer and the SAL in a central region (200) of the MR head. The MR sensor layer and the SAL are independently stabilized by first and second permanent magnet (PM) layers (160, 140), each formed in contact with one of the SAL and the MR sensor layer in first and second wing regions (210, 220) of the MR head. This allows a layer of low resistivity material (150) to be placed between the first and second PM layers in the first and second wing regions in order to lower the resistance of the MR head.

4 Claims, 2 Drawing Sheets

DUAL LAYER MAGNETIC EXCHANGE STABILIZATION FOR MR HEADS

The present application claims the benefit of earlier filed U.S. Provisional Application No. 60/044,340, entitled "DUAL LAYER MAGNETIC EXCHANGE STABILIZATION FOR MR HEADS", filed on Apr. 28, 1997.

BACKGROUND OF THE INVENTION

The present invention relates generally to magnetoresistive (MR) heads for use in disc drive data storage systems. More particularly, the present invention relates to an MR head having separate permanent magnet (PM) layers for stabilization of the MR sensor layer and the soft adjacent layer (SAL).

In order to provide the required head performance in magnetic recording applications, it is desirable to stabilize the MR element (MRE) or sensor layer into a single magnetic domain. Stabilization of the MRE layer into a single domain is typically achieved by the use of combinations of sensor geometry, anti-ferromagnetic layers, PM magnetostatic coupling layers, or PM ferromagnetic coupling layers. In designs using a SAL for vertical bias, both the SAL and the MR layer of the MR head should be stabilized into single domain states for optimal head performance.

In PM overlaid designs, the SAL and MRE layer are both ferromagnetically coupled to the PM layer. However, in these PM overlaid designs, the head resistance is large since no low resistivity layers can be used without affecting head stability. This is due to the fact that both the MR sensor layer and the SAL must be in contact with the PM for stabilization. Consequently, a low resistance MR head utilizing SAL and overlaid PM stabilization would be a significant improvement in the art.

SUMMARY OF THE INVENTION

A magnetoresistive (MR) head for use in a data storage system is disclosed. The MR head includes an MR sensor layer and a soft adjacent layer (SAL) disposed along a length of the MR sensor layer and adapted to vertically bias the MR sensor layer. A spacer layer is formed between the MR sensor layer and the SAL in a central region of the MR head. The MR sensor layer and the SAL are independently stabilized by first and second permanent magnet (PM) layers. The PM layers are in contact with SAL and MR layers in the wing regions of the MR head. This allows a layer of low resistivity material to be placed between the first and second PM layers in the first and second wing regions in order to lower the resistance of the MR head.

DETAILED DESCRIPTION OF THE PREFERRED EMBODIMENTS

The present invention is based in part upon the recognition that, if PM stabilization of the SAL is achieved independently of the PM stabilization of the MR sensor layer in a SAL biased MR head, a low resistivity layer can be included to lower the resistance of the head. To this end, in the MR heads of the present invention, two separate PM layers are used to independently stabilize the SAL and MR sensor layers. The SAL and one of the two PM layers are ferromagnetically coupled, while the MR sensor layer and the other PM layer are ferromagnetically coupled. An additional lower resistivity layer can be sandwiched between the two PM layers, thus providing stability and low resistance at the same time.

Figure 1:
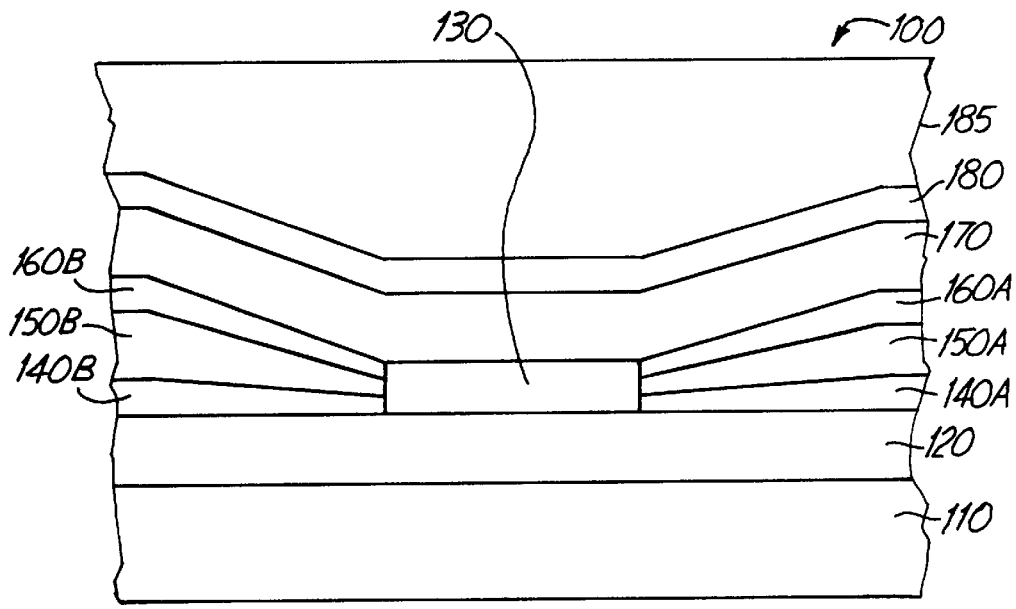
FIG. 1 is a diagrammatic illustration, as seen from an air hearing surface (ABS) perspective, of an MR head in accordance with preferred embodiments of the present invention.

As illustrated in FIG. 1, MR head 100 of the present invention includes first reader gap 110, SAL 120, spacer layer 130, first PM layer 140 (designated 140A and 140B in the wing regions of MR head 100), low resistivity layer 150 (designated 150A and 150B in the wing regions), second PM layer 160 (designated 160A and 160B in the wing regions), MR sensor layer or MRE 170, cap layer 180 and second reader gap 185. As used herein, references to layers 140, 150 and 160 are intended to include similar designations of these layers in the wing regions or active sensor area of the MR head. For example, a reference layer 140 is intended to include portions of layer 140 designated as 140A and 140B.

First reader gap 110 can be, for example, a layer of $Al_2O_3$ or other known gap materials. SAL 120 can be a layer of NiFeCr or any of a variety of other materials having low-coercivity and high-permeability which are known to be useful for SAL vertical biasing of the MRE. Examples of other materials which can be used to produce SAL 120 are NiFeRh and NiFeRe.

Spacer layer 130 can be Ta or other insulating spacer materials typically used between an MRE layer and a SAL in vertical bias techniques. For example, spacer layer 130 can be $SiO_2$ or $Al_2O_3$. PM layers 140 and 160 can be, for example, layers of CoCrPt having thicknesses of approximately 400 Å. However, PM layers 140 and 160 can be other materials such as CoPt or CoNiP. Further, PM layers 140 and 160 can each be made of a separate PM material, and can have thicknesses other than 400 Å. Low resistivity layer 150 can be, for example, a 600 Å thick layer of Cr or TiW/Ta. Layer 150 can also be made of other low resistivity materials such as Au and Mo, and can vary in thickness for particular applications.

MR sensor layer 170 can be any of a wide variety of MR materials. In preferred embodiments, MR sensor layer 170 is NiFe. Cap layer 180 can be any of a variety of materials commonly used as a cap in MR heads. In a preferred embodiment, layer 180 is Ta. While first and second reader gaps 110 and 185 can be any of a variety of materials, in a preferred embodiment, reader gaps 110 and 185 are alumina.

PM layer 140 stabilizes SAL 120 into a single domain using ferromagnetic coupling between the two layers. PM layer 160 stabilizes MR sensor layer 170 into a single domain also using ferromagnetic coupling between these two layers. This independent PM stabilization approach allows the use of low resistivity layer 150 sandwiched between the two PM layers 140 and 160 to lower the overall head resistance. Thus, in contrast to the prior art in which a single PM layer is formed adjacent to both of the MR sensor layer and the SAL, the present invention provides stability and low resistance at the same time.

Figure 2:
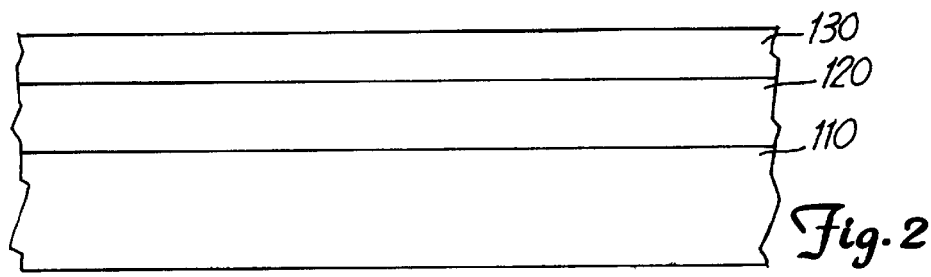
FIG. 2 is a diagrammatic illustration showing first steps in a method of fabricating the MR head shown in FIG. 1.

FIGS. 2–6 illustrate various steps in a method of fabricating MR head 100 in accordance with some preferred embodiments of the present invention. FIG. 1 illustrates still other steps in the method. Although not shown in the FIGS., the method can start for example with an Alsimag substrate covered with a 5 μm $Al_2O_3$ base coat, and a magnetic shield of Sendust, NiFe or other material. On top of this structure the first reader gap 110 is deposited. Next, SAL 120 and spacer layer 130 are deposited on top of first reader gap 110. This is illustrated in FIG. 2.

Figure 3:
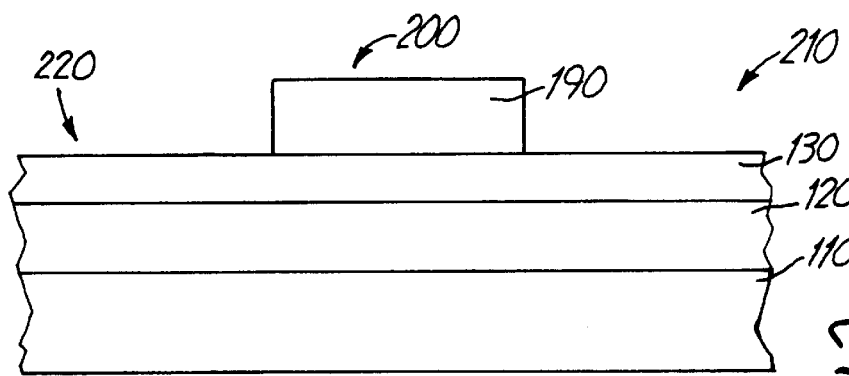
FIG. 3 is a diagrammatic illustration showing second steps in a method of fabricating the MR head shown in FIG. 1.

Next, as illustrated in FIG. 3, photoresist 190 is deposited on top of spacer layer 130 in an area which will become the active region or sensor area 200 of the MR head 100. Conventionally, a self-aligned etching and lift-off process has been used to remove the spacer layer outside of sensor area 200, and a PM layer would be deposited in right and left wing regions 210 and 220 adjacent the remaining spacer layer. However, the preferred method of producing MR head 100 of the present invention differs significantly in this respect.

Figure 4:
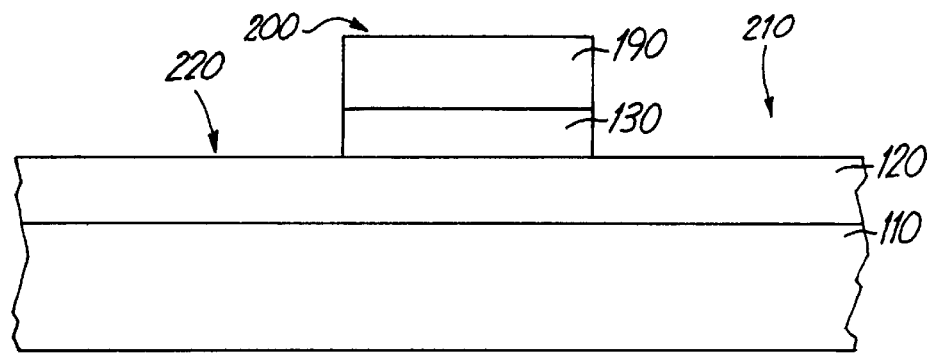
FIG. 4 is a diagrammatic illustration showing third steps in a method of fabricating the MR head shown in FIG. 1.
Figure 5:
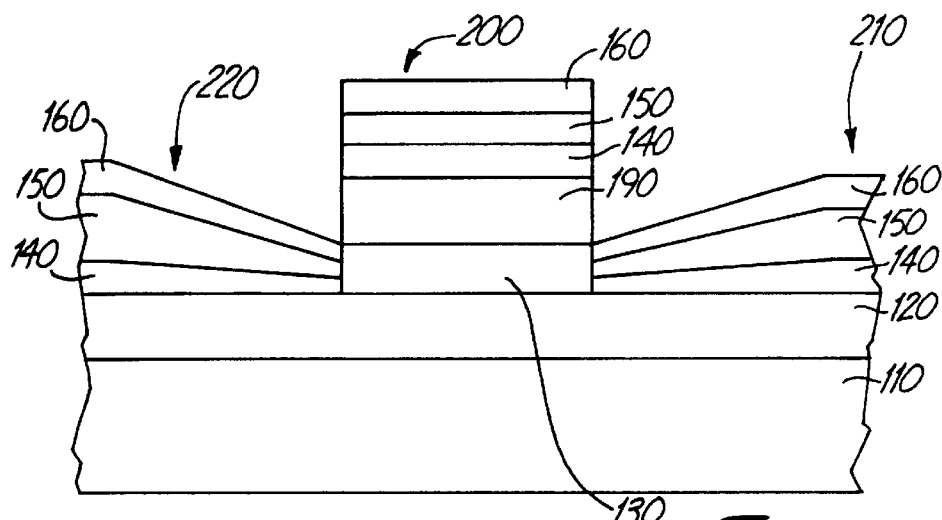
FIG. 5 is a diagrammatic illustration showing fourth steps in a method of fabricating the MR head shown in FIG. 1.

As illustrated in FIG. 4, spacer layer 130 is removed from wing regions 210 and 220 using an etching process similar to that used in prior art methods. Photoresist 190 protects spacer layer 130 in sensor area 200 to prevent the removal of the spacer layer in this area. Next, as illustrated in FIG. 5, layers 140, 150 and 160 are sequentially deposited on top of SAL 120 in wing regions 210 and 220, and on top of photoresist 190 in sensor area 200. Thus, in wing regions 210 and 220 the conventional single PM layer has been replaced by three layers: first PM layer 140, low resistivity metal layer 150 and second PM layer 160. This tri-layer is also deposited on top of photoresist 190.

Figure 6:
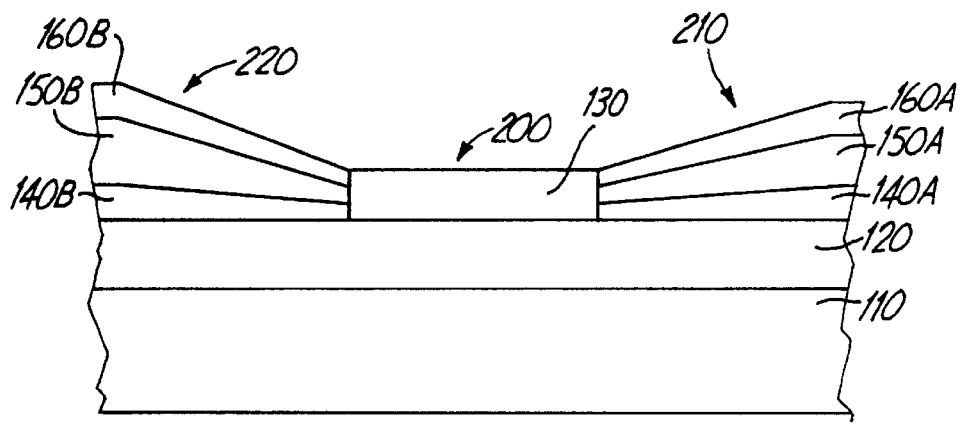
FIG. 6 is a diagrammatic illustration showing fifth steps in a method of fabricating the MR head shown in FIG. 1.

Next, as illustrated in FIG. 6, a lift-off process is used to remove photoresist 190 and the portions of layers 140, 150 and 160 deposited thereon. The result is that the first PM layer 140 is divided into portions 140A and 140B in regions 210 and 220, the low resistivity layer 150 is divided into portions 150A and 150B in regions 210 and 220, and the second PM layer 160 is divided into portions 160A and 160B in regions 210 and 220.

Finally, MR sensor layer 170, cap layer 180 and second reader gap layer 185 are deposited on top of spacer layer 130 in sensor area 200 and on top of second permanent magnet layer 160 in regions 210 and 220. The MR and cap layers are deposited over the structure before the height of the sensor is defined with a photomask and mill operation of the type known in the art. The structure having all of these layers deposited is illustrated in FIG. 1.

Particular attention should be given to the thicknesses of PM layers 140 and 160 in relation to the SAL 120 and MR sensor layer 170. The thicknesses of the PM layers is important since the stability of the SAL and MR sensor layer depend on the ratio of the Br*t (magnetic moment and thickness product) between the PM and the SAL or MR sensor layers. The structure of the PM under layer is important since the PM properties are effected by the characteristics of the underlayer.

The present invention provides numerous advantages. First, while single domains are achieved in the SAL and MR layers, stabilization of the SAL and MR layers are independently controllable. Further, the resistance outside of the active region or sensor area 200 is reduced by the ability to include low resistivity metal layer 150. In fact, the resistance outside of the sensor area is primarily determined by the new low resistivity metal layer. It should be noted that additional PM under layers can be added on top of low resistivity metal layer 150 if the PM layers require other materials to achieve a proper orientation. The present invention provides the advantages of independently controllable domain stabilization of the SAL and MR layers, without a loss in the on-track bit error rate (BER) or in the off-track BER. Further, the present invention achieves its advantageous without increasing fabrication complexity since no additional masking steps are required.

Although the present invention has been described with reference to preferred embodiments, workers skilled in the art will recognize that changes may be made in form and detail without departing from the spirit and scope of the invention. For example, while layer 150 can be a single layer chosen for its resistivity characteristics, or if desired chosen to also act as an underlayer for PM layer 160, in other embodiments layer 150 can be a multi-layer stack having individual layers chosen for low resistivity and other layers chosen to improve magnetic properties of PM layer 160. It should also be noted that in the design of the present invention, the multiple layers in the wing regions do not degrade on-track and off-track performance of the MR sensor.

What is claimed is:

1. A magnetoresistive sensor for use in a data storage system, the magnetoresistive sensor comprising:

a magnetoresistive sensor layer formed in a central region of the sensor and in first and second wing regions of the sensor adjacent first and second sides of the central region of the sensor;

a soft adjacent layer disposed along a length of the magnetoresistive sensor layer and adapted to vertically bias the magnetoresistive sensor layer;

a spacer layer formed between the magnetoresistive sensor layer and the soft adjacent layer in an active region of the magnetoresistive sensor;

a first permanent magnet layer formed in contact with the magnetoresistive sensor layer in the first and second wing regions of the magnetoresistive sensor, disposed adjacent the active region of the magnetoresistive sensor on the first and second sides of the active region, respectively;

a second permanent magnet layer formed in contact with the soft adjacent layer in the first and second wing regions of the magnetoresistive sensor, wherein each of the first and second permanent magnet layers are formed between the magnetoresistive sensor layer and the soft adjacent layer in the first and second wing regions; and a layer of low resistivity material formed between the first and second permanent magnet layers in the first and second wing regions, wherein the layer of low resistivity material has a resistivity which is lower than the resistivity of the first and second permanent magnet layers, thereby lowering the resistance of the magnetoresistive sensor in the first and second wing regions;

wherein a combined thickness of the first permanent magnet layer, the layer of low resistivity material and the second permanent magnet layer in portions of the first and second wing regions immediately adjacent the active region of the magnetoresistive sensor are substantially equal to a thickness of the spacer layer.

2. The magnetoresistive sensor of claim 1, wherein the second permanent magnet layer and the spacer layer are formed directly on top of the soft adjacent layer, wherein the layer of low resistivity material is formed directly on top of the second permanent magnet layer, wherein the first permanent magnet layer is formed directly on top of the layer of low resistivity material, and wherein the magnetoresistive sensor layer is formed directly on top of the first permanent magnet layer.

3. A magnetoresistive sensor comprising:

a magnetoresistive element layer formed in a central region of the sensor and in first and second wing regions of the sensor adjacent first and second sides of the central region of the sensor;

a soft adjacent layer adapted to vertically bias the magnetoresistive element layer and formed in the central region of the sensor and at least partially in the first and second wing regions of the sensor;

a spacer layer contacting and formed between each of the magnetoresistive element layer and the soft adjacent layer in the central region of the sensor;

a first permanent magnet layer formed between the magnetoresistive element layer and the soft adjacent layer in the first and second wing regions of the sensor, the first permanent magnet layer being formed in direct contact with and ferromagnetically coupling to the soft adjacent layer;

a second permanent magnet layer formed between the magnetoresistive element layer and the soft adjacent layer in the first and second wing regions of the sensor, the second permanent magnet layer being formed in direct contact with and ferromagnetically coupling to the magnetoresistive element layer; and a layer of low resistivity material formed directly on top of the first permanent magnet layer in the first and second wing regions of the sensor, wherein the second permanent magnet layer is formed directly on top of the layer of low resistivity material, wherein a combined thickness of the first permanent magnet layer, the layer of low resistivity material and the second permanent magnet layer in portions of the first and second wing regions immediately adjacent the central region of the magnetoresistive sensor are substantially equal to a thickness of the spacer layer, and wherein the layer of low resistivity material has a resistivity which is lower than the resistivity of the first and second permanent magnet layers, thereby lowering the resistance of the magnetoresistive sensor in the first and second wing regions.

4. The magnetoresistive sensor of claim 3, wherein the layer of low resistivity material acts as an underlayer for the second permanent magnet layer in order to improve the magnetic properties of the second permanent magnet layer.

* * * * *